US012118003B2

(12) United States Patent
Merker et al.

(10) Patent No.: US 12,118,003 B2
(45) Date of Patent: Oct. 15, 2024

(54) ON-DEMAND ACCESS OF DATABASE TABLE PARTITIONS

(71) Applicant: SAP SE, Walldorf (DE)

(72) Inventors: Till Merker, Sandhausen (DE); Paul Willems, Heidelberg (DE); Manuel Mayr, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/684,770

(22) Filed: Mar. 2, 2022

(65) Prior Publication Data

US 2023/0281201 A1    Sep. 7, 2023

(51) Int. Cl.
G06F 16/24    (2019.01)
G06F 16/23    (2019.01)
G06F 16/2453    (2019.01)
G06F 16/2455    (2019.01)

(52) U.S. Cl.
CPC .... G06F 16/24554 (2019.01); G06F 16/2343 (2019.01); G06F 16/24544 (2019.01)

(58) Field of Classification Search
CPC ............. G06F 16/2455; G06F 16/2343; G06F 16/2454; G06F 16/283; G06F 16/211; G06F 16/24
USPC .......................................................... 707/704
See application file for complete search history.

(56) References Cited

U.S. PATENT DOCUMENTS

| 6,990,503 | B1* | 1/2006 | Luo | G06F 16/2343 |
| 2015/0261807 | A1* | 9/2015 | Pathak | G06F 16/1774 |
| | | | | 707/704 |
| 2017/0109377 | A1* | 4/2017 | Baer | G06F 16/9535 |

* cited by examiner

*Primary Examiner* — Hosain T Alam
*Assistant Examiner* — Tracy M McGhee
(74) *Attorney, Agent, or Firm* — Mintz Levin Cohn Ferris Glovsky and Popeo, P.C.

(57) ABSTRACT

A method for on-demand access to table partitions may include receiving, at a data execution engine, a query accessing a database table divided into a first partition and a second partition stored at different nodes of the database. The data execution engine may respond to the query by acquiring a lock on the database table and instantiating data structures to support the execution of the query without loading any of the partitions of the database table into a main memory. Instead, the loading of the individual partitions of the database table may be delegated to the operators tasked with performing the operations included in the execution plan for the query. Each operator may refrain from loading those partitions of the database table that are determined to be unnecessary for performing the individual operations. Related systems and computer program products are also provided.

19 Claims, 5 Drawing Sheets

ON-DEMAND ACCESS OF DATABASE TABLE PARTITIONS

TECHNICAL FIELD

The subject matter described herein relates generally to database processing and more specifically to on-demand access to individual partitions of a database table.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for on-demand access to individual partitions of a database table. In some example embodiments, there is provided a system that includes at least one processor and at least one memory. The at least one memory may include program code that provides operations when executed by the at least one processor. The operations may include: receiving a query accessing a database table stored at a database, the database table having a first partition and a second partition; responding to the query by at least acquiring a lock on the database table without loading the first partition or the second partition into a main memory of the database; and delegating, to a first operator, a loading of the first partition and/or the second partition, the first operator being tasked with performing a first operation included in an execution plan of the query, and the first operator configured to refrain from loading, into the main memory, one or more partitions of the database table determined to be unnecessary for performing the first operation.

In some variations, one or more features disclosed herein including the following features can optionally be included in any feasible combination. The first operator may refrain from loading the one or more partitions of the database table upon completing the first operation.

In some variations, the first operator may refrain from loading the one or more partitions of the database table upon determining that the first operation cannot be performed.

In some variations, the first operator may refrain from loading the one or more partitions of the database table upon determining to cease a performance of the first operation.

In some variations, the first operation may include a top-k operation. The first operator may load the first partition but not the second partition upon identifying a k quantity of values within the first partition.

In some variations, the first operation may include a join operation between the database table and another database table. The first operator may refrain from loading the one or more partitions of the database table upon determining that the another database table is empty and/or contain records that fail to satisfy one or more conditions of the join operations.

In some variations, the loading of the first partition and/or the second partition may be further delegated to a second operator tasked with performing a second operation included in the execution plan of the query.

In some variations, the operations may further include: responding to the query by at least instantiating one or more data structures to support the execution of the query.

In some variations, the one or more data structures may include an index structure.

In some variations, the first partition and the second partition may be stored at different nodes of the database.

In some variations, the database table may be divided into the first partition and the second partition by applying one or more of hash partitioning, round-robin partitioning, and range partitioning.

In some variations, each of the first partition and the second partition may include one or more rows of the database table determined by applying, to one or more columns of the database table, a partitioning criteria.

In some variations, the operations may further include: identifying, based at least on a filter predicate imposed by the query, the first partition and/or the second partition as an unused partition not necessary for executing the query, the filter predicated being imposed on a column of the database table that is a part of the partitioning criteria, and the first partition and/or the second partition being identified as the unused partition based at least on the first partition and/or the second partition being occupied by records that fail to satisfy the filter predicate.

In another aspect, there is provided a method for on-demand access to individual partitions of a database table. The method may include: receiving a query accessing a database table stored at a database, the database table having a first partition and a second partition; responding to the query by at least acquiring a lock on the database table without loading the first partition or the second partition into a main memory of the database; and delegating, to a first operator, a loading of the first partition and/or the second partition, the first operator being tasked with performing a first operation included in an execution plan of the query, and the first operator configured to refrain from loading, into the main memory, one or more partitions of the database table determined to be unnecessary for performing the first operation.

In some variations, one or more features disclosed herein including the following features can optionally be included in any feasible combination. The first operator may refrain from loading the one or more partitions of the database table upon completing the first operation, upon determining that the first operation cannot be performed, and/or upon determining to cease a performance of the first operation.

In some variations, the first operation may include a top-k operation. The first operator may load the first partition but not the second partition upon identifying a k quantity of values within the first partition.

In some variations, the first operation may include a join operation between the database table and another database table. The first operator may refrain from loading the one or more partitions of the database table upon determining that that the another database table is empty and/or contain records that fail to satisfy one or more conditions of the join operations.

In some variation, the loading of the first partition and/or the second partition may be further delegated to a second operator tasked with performing a second operation included in the execution plan of the query.

In some variations, the method may further include identifying, based at least on a filter predicate imposed by the query, the first partition and/or the second partition as an unused partition not necessary for executing the query, the filter predicated being imposed on a column of the database table that is a part of a partitioning criteria for partitioning the database table into the first partition and the second partition, and the first partition and/or the second partition being identified as the unused partition based at least on the first partition and/or the second partition being occupied by records that fail to satisfy the filter predicate.

In another aspect, there is provided a computer program product including a non-transitory computer readable medium storing instructions. The instructions may cause operations may executed by at least one data processor. The operations may include: receiving a query accessing a database table stored at a database, the database table having a first partition and a second partition; responding to the query by at least acquiring a lock on the database table without loading the first partition or the second partition into a main memory of the database; and delegating, to a first operator, a loading of the first partition and/or the second partition, the first operator being tasked with performing a first operation included in an execution plan of the query, and the first operator configured to refrain from loading, into the main memory, one or more partitions of the database table determined to be unnecessary for performing the first operation.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an on-demand access of database table partitions, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
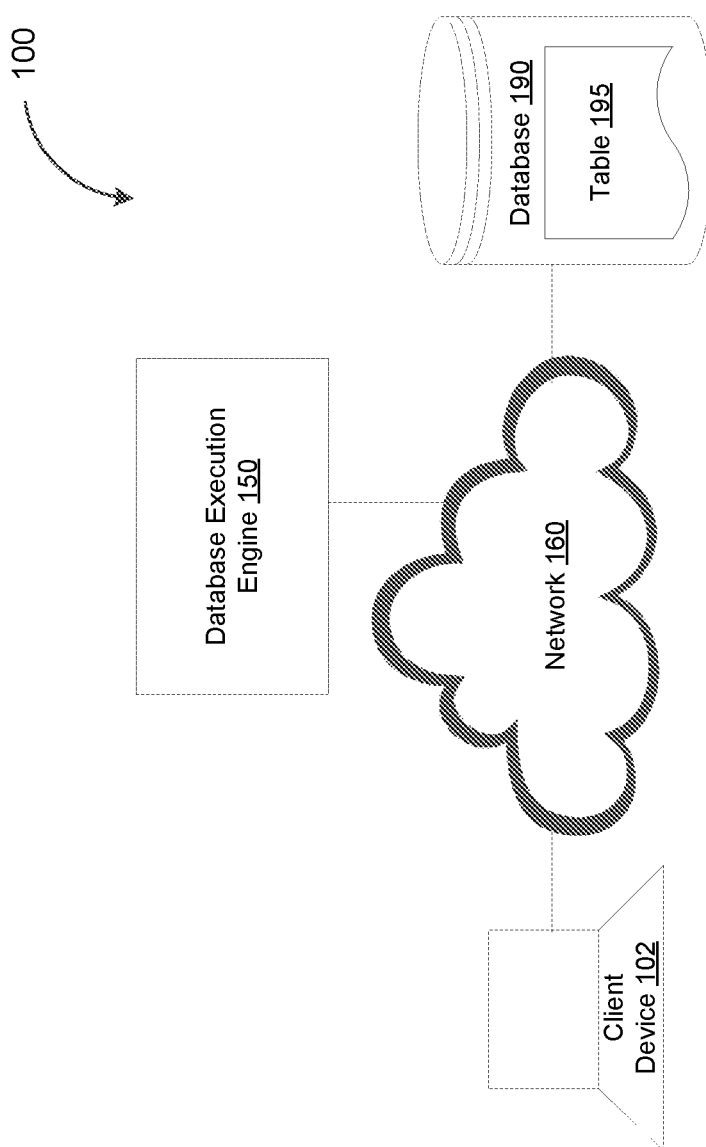
FIG. 1 depicts a system diagram illustrating an example of a database system, in accordance with some example embodiments.

An in-memory relational database may utilize main memory for the primary storage of database tables. In some cases, the in-memory relational database may be implemented as a column-oriented database (or a columnar database) that stores data from database tables by columns instead of by rows. As noted, each tuple of a relation may correspond to a record occupying one row of a database table while the columns of the database table may store the values of the common attributes shared by multiple tuples. Thus, in the columnar database, the values occupying each column of the database table, which may span multiple rows (or records) of the database table, may be stored sequentially in one or more data pages, with each data page storing at least a portion of a column. The in-memory column-oriented relational database may support efficient data compression and partitioning for massively parallel processing. Moreover, because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database, may be maximized by distributing the processing and storage of data across multiple computing nodes. For example, a single database table may be divided into multiple partitions (or internal tables) and stored across multiple computing nodes. Data from the database table may be distributed across the partitions in a variety of manner. With hash partitioning, for example, each row (or record) of the database table may be assigned to a partition based on the hash value of the data occupying one or more columns identified as the partitioning columns. In round-robin partitioning, the rows (or records) of the database table are assigned to the partitions on a rotation basis. In the case of range partitioning, each partition may be associated with certain values or ranges of values and each row (or record) of the database tables may be assigned to a partition based on the data occupying the one or more partitioning columns being within the range of values associated with the partition. In some cases, the distribution of data may be performed based on various combinations of hash partitioning, round-robin partitioning, and range partition such as hash-range partitioning, round-robin range partitioning, and range-range partitioning.

To execute a query accessing a database table, a conventional data execution engine may open every partition associated with the database table. This opening process may include acquiring one or more locks and instantiating one or more data structures to support the execution of the query (e.g., index structures and/or the like). If a partition of the database table is not already present in a main-memory, the opening of the database table may also include loading that partition into main-memory. In the event the database implements two-fragment tables in which new data is held in a delta fragment of the database table before being transferred to a main fragment of the database table during periodic delta merges that also include removing deleted rows, the opening of the database table may further entail performing a delta merge or waiting for a pending delta merge to complete. As such, opening the database table is a time-consuming and resource-intensive process. Where the query doesn't require every partition of the database table, opening every partition of the database table may lead to unnecessary delay and resource consumption. When loaded into main memory, unused partitions may also remain in main memory for extended periods of time and take up valuable storage capacity. For example, if the query imposes a filter predicate on a column that is a part of the partitioning criteria, the query will not access those partitions occupied by records (e.g., rows of the database table) that fail to satisfy the filter predicate. These unused partitions may therefore be pruned such that no time or computational resources are wasted toward opening them or keeping them in main memory.

However, pruning unused partitions at a query level, which includes pruning unused partitions via runtime parameters for filter predicates, does not prevent the opening of partitions that become unnecessary during the execution of individual operations included in the query execution plan for the query. The opening of certain partitions may be rendered unnecessary once an operation is complete, if the operation cannot be performed, or upon determining to cease performance of the operation (e.g., because the performance of the operation is no longer feasible). For example, once a top-k operation identifies a k quantity of values within a first partition of a database table, the opening of a second partition of the database table becomes superfluous. Alternatively, the opening of partitions may be obviated in the case of a join operation between two or more database tables if at least one of the tables are empty and/or contain records that fail to satisfy the join condition. As such, in some example embodiments, a data execution engine may delegate the loading of partitions to the individual operators responsible for performing the operations within each query. For instance, instead of the data execution engine loading every partition of a database table upon starting the execution of a query, the loading of individual partitions may be deferred to a later point in time at which the individual operators are able to identify which partitions are in fact necessary to perform each operation within the query.

FIG. 1 depicts a system diagram illustrating an example of a database system 100, in accordance with some example embodiments. Referring to FIG. 1, the database system 100 may include one or more client devices 102, a database execution engine 150, and one or more databases 190. As shown in FIG. 1, the one or more client devices 102, the database execution engine 150, and the one or more databases 190 may be communicative coupled via a network 160. The one or more databases 190 may include a variety of relational databases including, for example, an in-memory database, a column-based database, a row-based database, and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2:
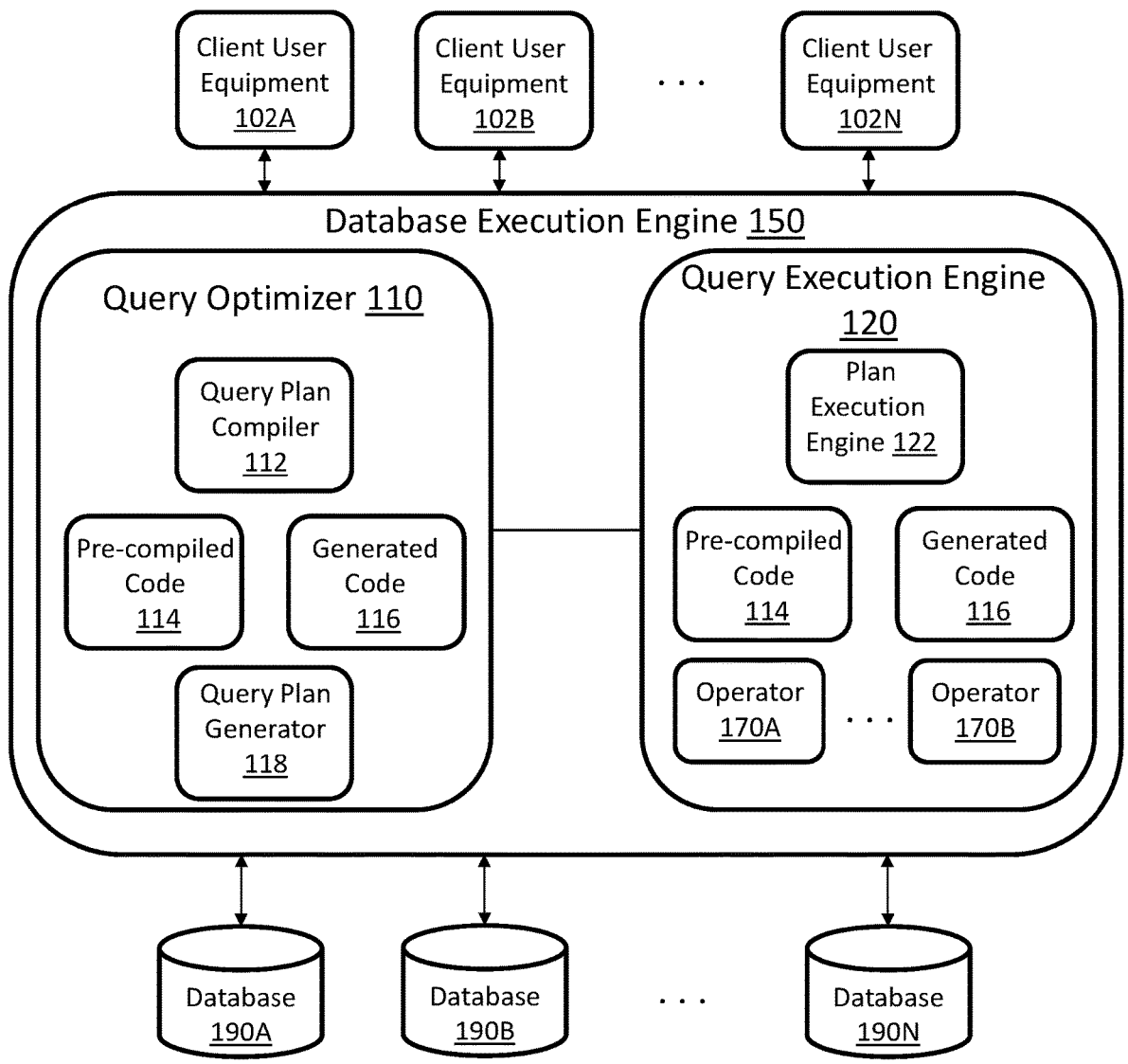
FIG. 2 depicts a block diagram illustrating an example of a database execution engine, in accordance with some example embodiments.

FIG. 2 depicts a block diagram illustrating an example of the data execution engine 150, in accordance with some example embodiments. As shown in FIG. 2, the one or more databases 190, which may include a first database 190A, a second database 190B, and a third database 190C, can represent the database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102, which may include the client devices 102A-N, may send a query via the data execution engine 150 to the database layer including the one or more databases 190, which may represent a persistence and/or storage layer where database tables may be stored and/or queried. The query may be sent via a connection, such as a wired connection and/or wireless connection (e.g., the Internet, cellular links, WiFi links, and/or the like) provided, for example, by the network 160.

Referring again to FIG. 2, the database execution engine 150 may include a query optimizer 110, such as a SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

In some example embodiments, the query optimizer 110 may optimize the query plan by compiling and generating code. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of one or more database 190.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190 include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190. Moreover, the query execution engine 120 may perform other operations including rule-based operations, such as joins and projections, as well as filtering, group by, multi-dimensional analysis, and/or the like to reduce the processing burden on the database layer. In this way, the query execution engine 120 may execute these and other complex operations, while the one or more databases 190 can perform simpler operations to reduce the processing burden at the one or more databases 190.

In some example embodiments, the query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

Figure 3:
FIG. 3 depicts an example of a database table with multiple partitions, in accordance with some example embodiments.

In some example embodiments, the database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the data execution engine 150 may divide the database table 195 into multiple partitions by applying one or more of a hash partitioning, round-robin partitioning, and range partitioning. For example, as shown in FIG. 3, the database table 195 may be divided into a first partition 165a, a second partition 165b, and a third partition 165c. Moreover, the first partition 165a may be stored at the first database 190A, the second partition 165b may be stored at the second database 190B, and the third partition 165c may be stored at the third database 190C.

To execute a query accessing the database table 195 may require opening one or more of the first partition 165a, the second partition 165b, and the third partition 165c. Opening one or more partitions of the database table 195 may include acquiring one or more locks and instantiating one or more data structures to support the execution of the query (e.g., index structures and/or the like). Moreover, if a partition of the database table 195 is not already present in a main-memory, the opening process may also include loading that partition into main-memory. In the event the database table 195 is implemented as a two-fragment table (e.g., storing new data in a delta fragment and performing periodic delta merges to transfer data in the delta fragment to a main fragment), the opening of a partition within the database table 195 may further entail performing a delta merge or waiting for a pending delta merge to complete. Due to the high overhead associated with opening a partition of the database table 195, the data execution engine 150 may implement one or more strategies to avoid opening partitions that are not required to execute the query. Thus, where the query doesn't require every partition of the database table 195, the data execution engine 150 may implement strategies to identify unused partitions of the database table 195 and avoid the opening of unused partitions. For example, if the query imposes a filter predicate on a column that is a part of the partitioning criteria, those partitions occupied by records (e.g., rows of the database table) that fail to satisfy the filter predicate may be identified as unused partitions.

However, pruning unused partitions at a query level, which includes pruning unused partitions based on runtime parameters for filter predicates, does not prevent the loading of partitions that become unnecessary during the execution of individual operations included in the execution plan for the query. The loading of certain partitions may be rendered unnecessary once an operation is complete, if the operation cannot be performed, or upon determining to cease performance of the operation (e.g., because the performance of the operation is no longer feasible) but the progress of individual operations within the execution plan of the query is not available to the data execution engine 150. As such, in some example embodiments, the data execution engine 150 may delegate the loading of partitions to the individual operators responsible for performing the operations within each query such as, for example, the one or more operators 170 within the query execution engine 120. For example, instead of the data execution engine 150 loading every partition of the database table 195 upon starting the execution of a query, the loading of individual partitions may be deferred to a later point in time at which the first operator 170A and the second operator 170B are able to identify which partitions are in fact necessary to perform the corresponding operations within the query.

As noted, the loading of certain partitions of the database table 195 may become unnecessary during the execution of individual operations within the execution plan of the query. For example, once a top-k operation identifies a k quantity of values within the first partition 165a of the database table 195, the loading of the second partition 165b and the third partition 165c becomes superfluous. Alternatively, the opening of partitions may be obviated in the case of a join operation between two or more database tables if at least one of the tables are empty and/or contain records that fail to satisfy the join condition.

Accordingly, in some example embodiments, instead of the data execution engine 150 loading every partition of the database table 195, the loading of individual partitions may be delegated to, for example, the first operator 170A tasked with performing the top-k operation, the second operator 170B tasked with performing the join operation between two or more database tables, and/or the like. Here, upon receiving a query accessing the database table 195, the data execution engine 150 may acquire one or more locks on the database table 195 and instantiate one or more data structures to support the execution of the query (e.g., index structures and/or the like) without loading any of the partitions in the database table 195 which, as noted, is delegated to the first operator 170A and the second operator 170B. As such, in the event the first operator 170A determines that a k quantity of values has been within the first partition 165a of the database table 195, the first operator 170B may refrain from loading the second partition 165b and the third partition 165c. Similarly, if the second operator 170B determines that at least one of the database tables involved in the join operation are empty and/or cannot contain records that satisfy the join condition, the second operator 170B may refrain from loading any of the partitions from that database table.

Figure 4:
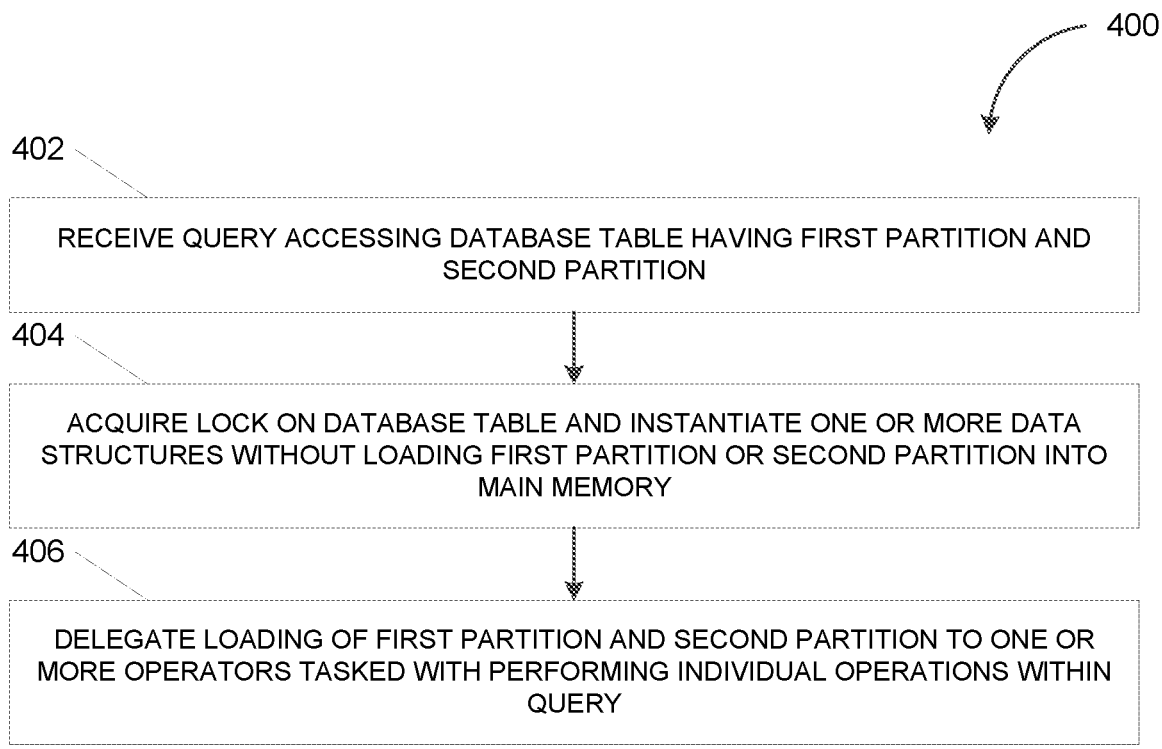
FIG. 4 depicts a flowchart illustrating an example of a process for on-demand access to individual partitions of a database table, in accordance with some example embodiments.

FIG. 4 depicts a flowchart illustrating an example of a process 400 for on-demand access to individual partitions of a database table, in accordance with some example embodiments. Referring to FIGS. 1-4, the process 400 may be performed by the data execution engine 150 in order to execute a query accessing the database table 195 stored at the one or more databases 190.

At 402, the data execution engine 150 may receive a query accessing a database table having a first partition and a second partition. For example, the data execution engine 150 may receive, from the one or more client devices 120, a query accessing the database table 195. As shown in FIG. 3, the database table 195 may include multiple partitions including, for example, the first partition 165a, the second partition 165b, and the third partition 165c. In cases where the database layer associated with the data execution engine 150 provides a distributed data storage, the processing and storage of the database table 195 may be distributed across multiple nodes including, for example, the first database 190A, the second database 190B, the third database 190C, and/or the like. For instance, the first partition 165a may be stored at the first database 190A, the second partition 165b may be stored at the second database 190B, and the third partition 165c may be stored at the third database 190C.

At 404, the data execution engine 150 may acquire a lock on the database table and instantiate one or more data structures without loading the first partition or the second partition into a main memory. In some example embodiments, the data execution engine 150 may respond to the query accessing the database table 195 by acquiring one or more locks on the database table 195. Alternatively and/or additionally, the database execution engine 150 may respond to the query accessing the database table 195 by instantiating one or more data structures (e.g., index structures and/or the like). However, to avoid loading partitions of the database table 195 not required by the query, the database execution engine 150 may refrain from loading any of the first partition 165a, the second partition 165b, and the third partition 165c associated with the database table 195. Instead, the loading of the partitions of the database table 195 may be delegated to the operators responsible for performing the individual operations within the query.

At 406, the data execution engine 150 may delegate loading of the first partition and the second partition to one or more operators tasked with performing individual operations within the query. For example, the data execution engine 150 may delegate the loading of the partitions of the database table 195 may be delegated to the first operator 170A tasked with performing a first operation within the query and the second operator 170B tasked with performing a second operation within the query. The loading of the partitions of the database table 195 may therefore be performed on a more granular, as-needed basis than pruning unused partition at the query level (e.g., based on runtime parameters for filter predicates). In particular, the first operator 170A and the second operator 170B may be capable of determining when the loading of partitions is rendered unnecessary during the execution of individual operations. For instance, once a top-k operation identifies a k quantity of values within the first partition 165a of the database table 195, the first operator 170A performing the top-k operation may refrain from loading of the second partition 165b and the third partition 165c. Alternatively, the second operator 170B may refrain from loading partitions when performing a join operation between two or more database tables if the second operator 170B determines that at least one of the tables are empty and/or contain records that fail to satisfy the join condition.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving a query accessing a database table stored at a database, the database table having a first partition and a second partition; responding to the query by at least acquiring a lock on the database table without loading the first partition or the second partition into a main memory of the database; and delegating, to a first operator, a loading of the first partition and/or the second partition, the first operator being tasked with performing a first operation included in an execution plan of the query, and the first operator configured to refrain from loading, into the main memory, one or more partitions of the database table determined to be unnecessary for performing the first operation.

Example 2: The system of Example 1, wherein the first operator refrains from loading the one or more partitions of the database table upon completing the first operation.

Example 3: The system of any one of Examples 1 to 2, wherein the first operator refrains from loading the one or more partitions of the database table upon determining that the first operation cannot be performed.

Example 4: The system of any one of Examples 1 to 3, wherein the first operator refrains from loading the one or more partitions of the database table upon determining to cease a performance of the first operation.

Example 5: The system of any one of Examples 1 to 4, wherein the first operation comprises a top-k operation, and wherein the first operator loads the first partition but not the second partition upon identifying a k quantity of values within the first partition.

Example 6: The system of any one of Examples 1 to 5, wherein the first operation comprises a join operation between the database table and another database table, and wherein the first operator refrains from loading the one or more partitions of the database table upon determining that that the another database table is empty and/or contain records that fail to satisfy one or more conditions of the join operations.

Example 7: The system of any one of Examples 1 to 6, wherein the loading of the first partition and/or the second partition is further delegated to a second operator tasked with performing a second operation included in the execution plan of the query.

Example 8: The system of any one of Examples 1 to 7, wherein the operations further comprise: responding to the query by at least instantiating one or more data structures to support the execution of the query.

Example 9: The system of Example 8, wherein the one or more data structures include an index structure.

Example 10: The system of any one of Examples 1 to 9, wherein the first partition and the second partition are stored at different nodes of the database.

Example 11: The system of any one of Examples 1 to 10, wherein the database table are divided into the first partition and the second partition by applying one or more of a hash partitioning, round-robin partitioning, and range partitioning.

Example 12: The system of any one of Examples 1 to 11, wherein each of the first partition and the second partition include one or more rows of the database table determined by applying, to one or more columns of the database table, a partitioning criteria.

Example 13: The system of any one of Examples 1 to 12, wherein the operations further comprise: identifying, based at least on a filter predicate imposed by the query, the first partition and/or the second partition as an unused partition not necessary for executing the query, the filter predicated being imposed on a column of the database table that is a part of the partitioning criteria, and the first partition and/or the second partition being identified as the unused partition based at least on the first partition and/or the second partition being occupied by records that fail to satisfy the filter predicate.

Example 14: A method, comprising: receiving a query accessing a database table stored at a database, the database table having a first partition and a second partition; responding to the query by at least acquiring a lock on the database table without loading the first partition or the second partition into a main memory of the database; and delegating, to a first operator, a loading of the first partition and/or the second partition, the first operator being tasked with performing a first operation included in an execution plan of the query, and the first operator configured to refrain from loading, into the main memory, one or more partitions of the database table determined to be unnecessary for performing the first operation.

Example 15: The method of Example 14, wherein the first operator refrains from loading the one or more partitions of the database table upon completing the first operation, upon determining that the first operation cannot be performed, and/or upon determining to cease a performance of the first operation.

Example 16: The method of any one of Examples 14 to 15, wherein the first operation comprises a top-k operation, and wherein the first operator loads the first partition but not the second partition upon identifying a k quantity of values within the first partition.

Example 17: The method of any one of Examples 14 to 16, wherein the first operation comprises a join operation between the database table and another database table, and wherein the first operator refrains from loading the one or more partitions of the database table upon determining that the another database table is empty and/or contain records that fail to satisfy one or more conditions of the join operations.

Example 18: The method of any one of Examples 14 to 17, wherein the loading of the first partition and/or the second partition is further delegated to a second operator tasked with performing a second operation included in the execution plan of the query.

Example 19: The method of any one of Examples 14 to 18, further comprising: identifying, based at least on a filter predicate imposed by the query, the first partition and/or the second partition as an unused partition not necessary for executing the query, the filter predicated being imposed on a column of the database table that is a part of a partitioning criteria for partitioning the database table into the first partition and the second partition, and the first partition and/or the second partition being identified as the unused partition based at least on the first partition and/or the second partition being occupied by records that fail to satisfy the filter predicate.

Example 20: A non-transitory computer readable medium storing instructions, which when executed by at least one data processor, result in operations comprising: receiving a query accessing a database table stored at a database, the database table having a first partition and a second partition; responding to the query by at least acquiring a lock on the database table without loading the first partition or the second partition into a main memory of the database; and delegating, to a first operator, a loading of the first partition and/or the second partition, the first operator being tasked with performing a first operation included in an execution plan of the query, and the first operator configured to refrain from loading, into the main memory, one or more partitions of the database table determined to be unnecessary for performing the first operation.

Figure 5:
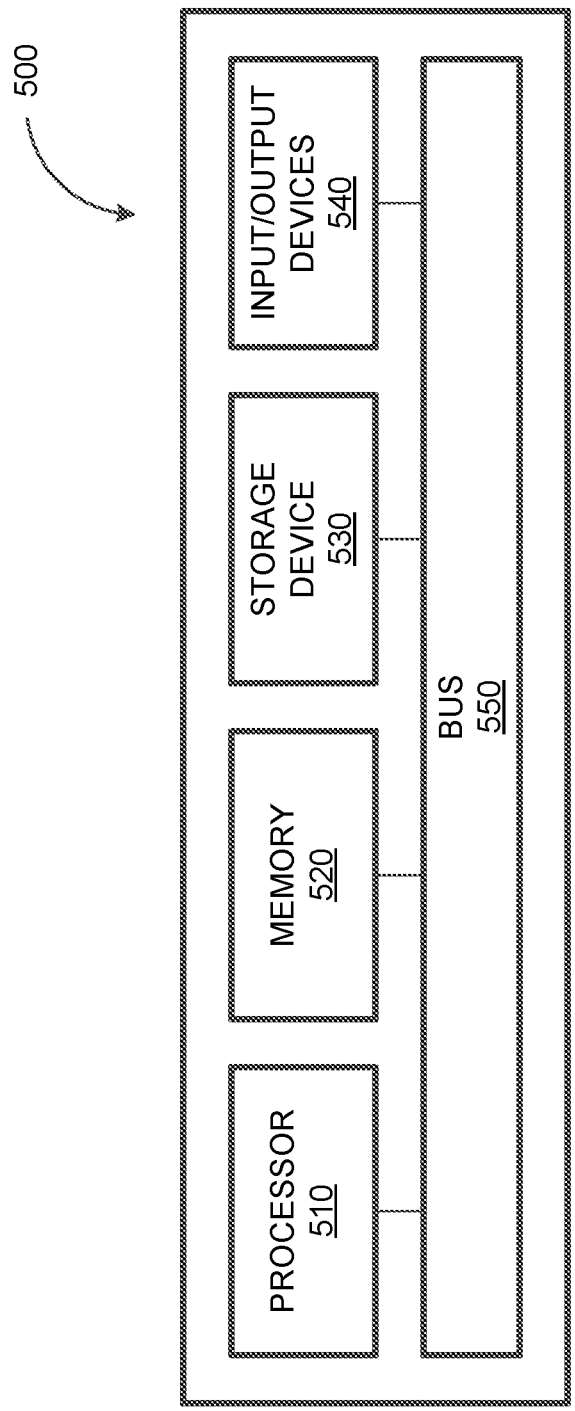
FIG. 5 depicts a block diagram illustrating an example of a computing system, in accordance with some example embodiments.

FIG. 5 depicts a block diagram illustrating an example of a computing system 500 consistent with implementations of the current subject matter. Referring to FIGS. 1-5, the computing system 500 may implement the data execution engine 150 and/or any components therein.

As shown in FIG. 4, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the data execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   receiving a query for accessing a first database table stored at a database, the first database table comprising a first partition and a second partition;
   determining, by using a data execution engine, an execution plan of the query, the execution plan comprising a first operation;
   responding to the query by at least acquiring a lock on the first database table without loading the first partition or the second partition into a main memory of the database;
   identifying, based at least on a filter predicate imposed by the query, the second partition as an unused partition not necessary for executing the query, the filter predicate being imposed on a column of the first database table that is a part of the partitioning criteria, and the second partition being identified as the unused partition based at least on the second partition being occupied by records that fail to satisfy the filter predicate; and
   delegating, to a first operator, an execution of the first operation of the execution plan of the query, the first operator determining usage of the first partition for execution of the first operation of the execution plan, the first operator loading the first partition into the main memory, and deferring loading of the second partition, into the main memory, to a later point in time when the first operator is able to determine whether the first operation is executable without the second partition.

2. The system of claim 1, wherein the first operator refrains from loading the second partition of the first database table upon completing the first operation.

3. The system of claim 1, wherein the first operator refrains from loading the second partition of the first database table upon determining that the first operation cannot be performed.

4. The system of claim 1, wherein the first operator refrains from loading the second partition of the first database table upon determining to cease a performance of the first operation.

5. The system of claim 1, wherein the first operation comprises a top-k operation, and wherein the first operator loads the first partition but not the second partition upon identifying a k quantity of values within the first partition.

6. The system of claim 1, wherein the first operation comprises a join operation between the first database table and a second database table, and wherein the first operator refrains from loading the second partition of the first database table upon determining that the second database table is empty and/or contain records that fail to satisfy one or more conditions of the join operations.

7. The system of claim 1, wherein the operations further comprise:
   delegating, to a second operator, a second loading of the second partition for performing a second operation included in the execution plan of the query.

8. The system of claim 1, wherein the operations further comprise:
   responding to the query by at least instantiating one or more data structures to support the execution of the query.

9. The system of claim 8, wherein the one or more data structures comprise an index structure.

10. The system of claim 1, wherein the first partition and the second partition are stored at different nodes of the database.

11. The system of claim 1, wherein the first database table is divided into the first partition and the second partition by applying one or more of hash partitioning, round-robin partitioning, and range partitioning.

12. The system of claim 1, wherein each of the first partition and the second partition comprise one or more rows of the first database table determined by applying, to one or more columns of the first database table, a partitioning criteria.

13. A computer-implemented method, comprising:
    receiving a query for accessing a first database table stored at a database, the first database table comprising a first partition and a second partition;
    determining, by using a data execution engine, an execution plan of the query, the execution plan comprising a first operation;
    responding to the query by at least acquiring a lock on the first database table without loading the first partition or the second partition into a main memory of the database;
    identifying, based at least on a filter predicate imposed by the query, the second partition as an unused partition not necessary for executing the query, the filter predicate being imposed on a column of the first database table that is a part of the partitioning criteria, and the second partition being identified as the unused partition based at least on the second partition being occupied by records that fail to satisfy the filter predicate; and
    delegating, to a first operator, an execution of the first operation of the execution plan of the query, the first operator determining usage of the first partition for execution of the first operation of the execution plan, the first operator loading the first partition into the main memory, and deferring loading of the second partition, into the main memory, to a later point in time when the first operator is able to determine whether the first operation is executable without the second partition.

14. The computer-implemented method of claim 13, wherein the first operator refrains from loading the second partition of the first database table upon completing the first operation, upon determining that the first operation cannot be performed, and/or upon determining to cease a performance of the first operation.

15. The computer-implemented method of claim 13, wherein the first operation comprises a top-k operation, and wherein the first operator loads the first partition but not the second partition upon identifying a k quantity of values within the first partition.

16. The computer-implemented method of claim 13, wherein the first operation comprises a join operation between the first database table and a second database table, and wherein the first operator refrains from loading the second partition of the first database table upon determining that the second database table is empty and/or contain records that fail to satisfy one or more conditions of the join operations.

17. The computer-implemented method of claim 13, further comprising:
    delegating, to a second operator, a second loading of the second partition for performing a second operation included in the execution plan of the query.

18. The computer-implemented method of claim 13, further comprising:
    identifying, based at least on a filter predicate imposed by the query, the first partition and/or the second partition as an unused partition not necessary for executing the query, the filter predicate being imposed on a column of the first database table that is a part of a partitioning criteria for partitioning the first database table into the first partition and the second partition, and the first partition and/or the second partition being identified as the unused partition based at least on the first partition and/or the second partition being occupied by records that fail to satisfy the filter predicate.

19. A non-transitory computer readable medium storing instructions, which when executed by at least on data processor, result in operations comprising:
    receiving a query for accessing a database table stored at a database, the database table comprising a first partition and a second partition;
    determining, by using a data execution engine, an execution plan of the query, the execution plan comprising a first operation;
    responding to the query by at least acquiring a lock on the database table without loading the first partition or the second partition into a main memory of the database;
    identifying, based at least on a filter predicate imposed by the query, the second partition as an unused partition not necessary for executing the query, the filter predicate being imposed on a column of the first database table that is a part of the partitioning criteria, and the second partition being identified as the unused partition based at least on the second partition being occupied by records that fail to satisfy the filter predicate; and
    delegating, to a first operator, an execution of the first operation of the execution plan of the query, the first operator determining usage of the first partition for execution of the first operation of the execution plan, the first operator loading the first partition into the main memory, and deferring loading of the second partition, into the main memory, to a later point in time when the first operator is able to determine whether the first operation is executable without the second partition.

* * * * *